United States Patent
Sakamoto et al.

(10) Patent No.: US 7,595,822 B2
(45) Date of Patent: Sep. 29, 2009

(54) DRIVING METHOD OF SOLID-STATE IMAGE PICKUP DEVICE

(75) Inventors: Tomohiro Sakamoto, Kurokawa-gun (JP); Tetsuo Yamada, Kurokawa-gun (JP)

(73) Assignee: Fujifilm Corporation, Tokyo (JP)

( * ) Notice: Subject to any disclaimer, the term of this patent is extended or adjusted under 35 U.S.C. 154(b) by 409 days.

(21) Appl. No.: 11/585,145

(22) Filed: Oct. 24, 2006

(65) Prior Publication Data

US 2007/0103573 A1   May 10, 2007

(30) Foreign Application Priority Data

Nov. 8, 2005   (JP) ............................. 2005-323377

(51) Int. Cl.
*H04N 5/235* (2006.01)
*H04N 5/335* (2006.01)

(52) U.S. Cl. ............... 348/230.1; 348/296; 348/294

(58) Field of Classification Search ............... 348/230, 348/272, 273, 274, 277–279, 281, 290, 292, 348/302, 311, 315, 317, 320, 322; 257/242, 257/291–292, 329; 250/208.1, 214
See application file for complete search history.

(56) References Cited

U.S. PATENT DOCUMENTS

| | | | | |
|---|---|---|---|---|
| 5,870,142 A * | 2/1999 | Noda et al. | ................. | 348/266 |
| 6,236,434 B1 * | 5/2001 | Yamada | ....................... | 348/315 |
| 6,243,135 B1 * | 6/2001 | Nakashiba | .................. | 348/314 |
| 6,388,278 B1 * | 5/2002 | Suzuki et al. | ................ | 257/222 |
| 6,400,404 B2 * | 6/2002 | Hirota et al. | ................. | 348/314 |
| 6,930,722 B1 * | 8/2005 | Nakamura et al. | .......... | 348/362 |
| 6,933,976 B1 * | 8/2005 | Suzuki | ....................... | 348/315 |
| 7,050,101 B2 * | 5/2006 | Wako et al. | ................. | 348/314 |
| 7,315,330 B2 * | 1/2008 | Hamasaki | .................... | 348/314 |
| 2002/0039144 A1 * | 4/2002 | Yamada | ....................... | 348/311 |

FOREIGN PATENT DOCUMENTS

JP     2002-112122 A     4/2002
JP     2002-185870 A     6/2002

* cited by examiner

*Primary Examiner*—Tuan V Ho
*Assistant Examiner*—Euel K Cowan
(74) *Attorney, Agent, or Firm*—Birch, Stewart, Kolasch & Birch, LLP

(57) ABSTRACT

During a first horizontal blanking period, signal charges on a first row are transferred from a vertical transfer channel to a line memory. During a second horizontal blanking period, the transferred signal charges are partly transferred from the line memory to a horizontal transfer channel. During a third horizontal blanking period, the remaining signal charges on the first row are transferred from the line memory to the horizontal transfer channel. Thereafter, the signal charges on the second row next to the first row are transferred from the vertical transfer channel to a line memory that is vacant.

6 Claims, 5 Drawing Sheets

DRIVING METHOD OF SOLID-STATE IMAGE PICKUP DEVICE

BACKGROUND OF THE INVENTION

1. Field of the Invention

The present invention relates to a driving method of a solid-state image pickup device.

2. Description of the Related Art

Figure 3A:
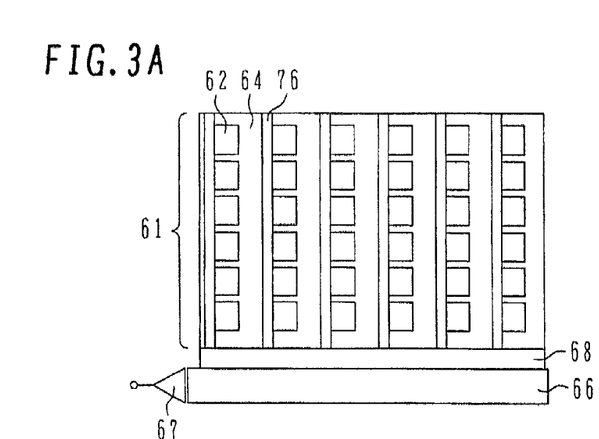
FIGS. 3A and 3B are plan views schematically showing the structure of a CCD solid-state image pickup device.
Figure 3B:
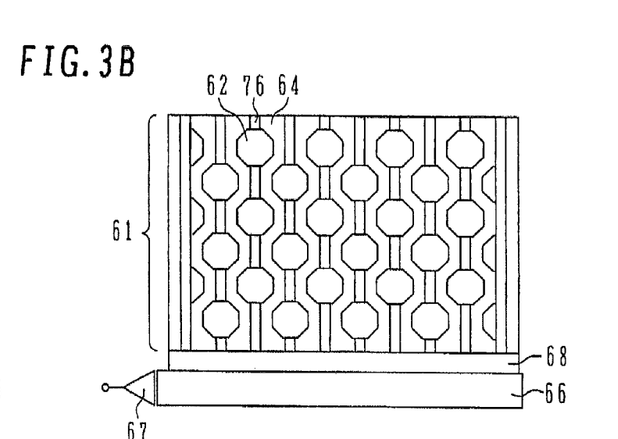
Figure 3C:
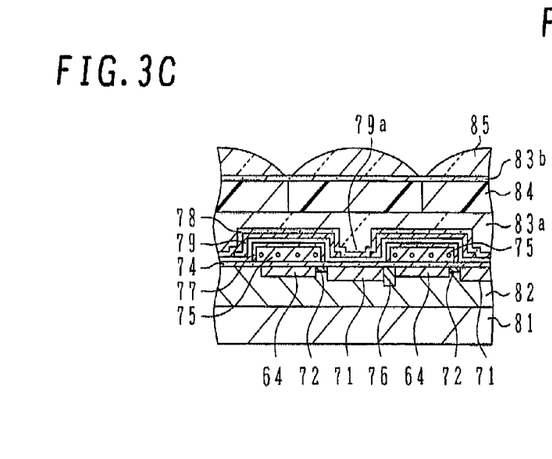
FIG. 3C is a cross-sectional view schematically showing a part of a light receiving region on the CCD solid-state image pickup device.
Figure 3D:
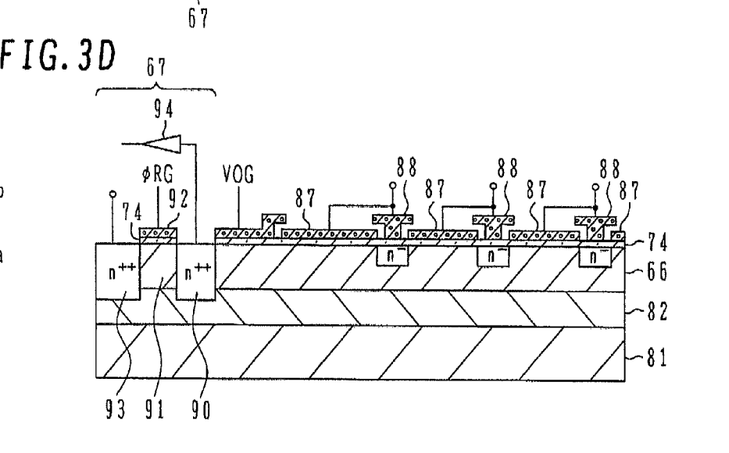
FIG. 3D is a cross-sectional view schematically showing a horizontal transfer channel and a part of a charge detecting unit in the CCD solid-state image pickup device.

Hereinbelow, a description is given of the structure of a CCD solid-state image pickup device with reference to FIGS. 3A to 3D. FIGS. 3A and 3B are plan views schematically showing the structure of the CCD solid-state image pickup device. FIG. 3C is a cross-sectional view schematically showing a part of a light receiving region of the CCD solid-state image pickup device. FIG. 3D is a cross-sectional view schematically showing a horizontal transfer channel and a part of a charge detecting unit in the CCD solid-state image pickup device.

Referring to FIG. 3A, the CCD solid-state image pickup device comprises: a plurality of photosensitive regions 62 arranged like a square matrix; a plurality of vertical transfer channels (vertical CCDs) 64 formed along columns of the plurality of photosensitive regions 62; a channel stop region 76 between columns of the adjacent vertical transfer channels 64; a line memory 68 formed to one end of the vertical transfer channels 64 out of a light receiving region (pixel array region) 61; a horizontal transfer channel (horizontal CCD) 66 electrically connected to the plurality of vertical transfer channels 64 via the line memory 68; and a charge detecting unit 67 coupled to an end of the horizontal transfer channel 66. Incidentally, the light receiving region 61 comprises the photosensitive region 62 and the vertical transfer channel 64.

The photosensitive region 62 comprises a photosensitive device, e.g., a photodiode and a transfer gate. The photodiode generates and stores signal charges in accordance with the amount of incident light. The stored signal charges are read from the transfer gate to the vertical transfer channel 64, and are externally transferred in the vertical transfer channels 64 in the direction of the horizontal transfer channel 66 (vertical direction, i.e., in the column direction). The signal charges transferred to an end of the vertical transfer channels 64 are temporarily stored to the line memory 68, and are thereafter transferred to the horizontal transfer channel 66 row by row.

The signal charges transferred to the horizontal transfer channel 66 are entirely transferred in the horizontal transfer channel 66 in the direction intersecting to vertical direction, e.g., horizontal direction (in the direction orthogonal to the vertical direction, i.e., in the row direction), and are thereafter transferred to the charge detecting unit 67. In the charge detecting unit 67, charge/voltage conversion and signal amplification are performed on the basis of the signal charges transferred from the horizontal transfer channel 66. An amplified image signal is externally extracted.

An array of the photosensitive region 62 includes a tetragonal array arranged like a square matrix at a constant pitch in the row direction and in the column direction, as shown in FIG. 3A and a pixel interleaved array (PIA) alternately arranged at displaced positions of ½ pitch alternately in the row direction and in the column direction.

FIG. 3B is a plan view schematically showing the CCD solid-state image pickup device having pixel interleaved arrays. The pixel interleaved array contains a first photosensitive region arranged like a square matrix, and a second photosensitive region arranged like a square matrix between grids. The vertical transfer channels 64 are formed to be spiral between the photosensitive regions 62. Similarly in this case, the signal charges are entirely transferred in the vertical transfer channels 64 in the direction of the horizontal transfer channel 66 (vertical direction). The photosensitive region 62 on the pixel interleaved array is octagonal in many cases.

FIG. 3C is a cross-sectional view showing a part of a light receiving region in the CCD solid-state image pickup device. A p-type well layer 82 formed to a semiconductor substrate 81 as an n-type silicon substrate comprises a charge storage region 71 having an n-type impurity added region, and an n-type region vertical transfer channel 64 close to a plurality of the charge storage regions 71 via a p-type transfer gate 72. On the top of the transfer gate 72 and the vertical transfer channels 64, a vertical transfer electrode 75 is formed via an insulating film 74. A p-type channel stop region 76 is formed between the adjacent charge storage regions 71.

The channel stop region 76 electrically isolates the charge storage region 71 and the vertical transfer channels 64. The insulating film 74 has a laminated structure (ONO film) having an oxide film, a nitride film, and an oxide film formed onto the surface of the semiconductor substrate 81. The vertical transfer electrode 75 contains a first-layer vertical transfer electrode and a second-layer vertical transfer electrode containing polysilicon. The first-layer vertical transfer electrode and the second-layer vertical transfer electrode can contain amorphous silicon. The vertical transfer electrode 75 controls the potentials of the vertical transfer channels 64 and the transfer gate 72, thereby reading the charges stored to the charge storage region 71 to the vertical transfer channels 64 and transferring the read charges in the column direction of the vertical transfer channels 64.

On the vertical transfer electrode 75, an insulating oxide silicon film 77 obtained by thermal oxidation of polysilicon is formed.

On the upper portion of the vertical transfer electrode 75, an insulating oxide silicon film 77 and a light shielding film 79 containing tungsten (W) are formed on the entire surface of the substrate with CVD via an insulating layer such as oxide silicon or silicon nitride. The light shielding film 79 has an opening portion 79a on the upper portion of the charge storage region 71. The light shielding film 79 prevents light incident on the light receiving region 61 from being incident on an area other than the charge storage region 71. On the light shielding film 79, a silicon nitride film 78 is formed. Incidentally, the silicon nitride film 78 is not necessary.

Above the light shielding film 79, a planarized layer 83a containing BPSG (boro-phospho silicate glass) is formed. On the planar surface, a color filter layer 84 containing three primary colors of red (R), green (G), and blue (B) is formed. In order to planarize the surface of the color filter layer 84, a planarized layer 83b is further formed. On the planarized layer 83b having the planar surface, a microlens 85 is formed by fusing and fixing a photoresist pattern. The microlens 85 is formed arranging fine semispherical convex lenses above the charge storage regions 71. The microlens 85 condenses the incident light to the charge storage region 71. The light condensed by the one microlens 85 is incident on one the charge storage region 71 (photodiode) through the color filter layer 84 of any of red (R), green (G), and blue (B). Therefore, a plurality of photodiodes include three types of photodiodes having a photodiode on which light transmitted via the color filter layer 84 of red (R), a photodiode on which light transmitted via the color filter layer 84 of green (G), and a photodiode on which light transmitted via the color filter layer 84 of blue (B), which are thereabove.

The signal charges stored to the charge storage region 71 in accordance with the amount of incident light are read to the vertical transfer channels 64 by a drive signal (reading voltage) applied to the vertical transfer electrode 75 above the transfer gate 72, and are transferred in the vertical transfer channels 64 by a drive signal (transfer voltage) applied to the vertical transfer electrode 75.

FIG. 3D is a cross-sectional view schematically showing a horizontal transfer channel and a part of charge detecting unit in the CCD solid-state image pickup device.

An n-type horizontal transfer channel 66 is formed in the p-type well layer 82 formed to the surface portion of an n-type semiconductor substrate 81. Above the horizontal transfer channel 66, a first-layer horizontal transfer electrode 87 and a second-layer horizontal transfer electrode 88 are alternately formed along the length direction of the horizontal transfer channel 66 via the insulating film 74.

A low-density impurity region ($n^-$-type region) is formed below between the adjacent first-layer horizontal transfer electrodes 87, and forms a potential barrier for preventing regurgitation. An n-type region between the $n^-$-type regions form a potential well. The potential well and the potential barrier on the upstream (right) form one transfer stage. As mentioned above, the charge detecting unit 67 is formed to the end of the horizontal transfer channel 66.

The first-layer horizontal transfer electrode 87 and the second-layer horizontal transfer electrode 88 are commonly connected every transfer stage. The signal charges are transferred in the horizontal transfer channel 66 in the left direction of the horizontal one by drive signals (transfer voltages) applied to the first-layer horizontal transfer electrode 87 and the second-layer horizontal transfer electrode 88. The first-layer horizontal transfer electrode 87 and the second-layer horizontal transfer electrode 88 contain polycrystal silicon or amorphous silicon.

The horizontal transfer channel 66 at the final transfer stage is connected to a floating diffusion 90 of the charge detecting unit 67 via a transfer portion to which an output gate voltage VOG is applied. The signal charges transferred in the horizontal transfer channel 66 are transferred to the charge detecting unit 67 (floating diffusion 90).

The charge detecting unit 67 comprises: an $n^{++}$-type floating diffusion 90; an n-type reset gate (RS) 91; an $n^{++}$-type reset drain (reset drain: RD) 93; a reset gate electrode 92 formed above the reset gate 91 via the insulating film 74; and an amplifier 94 including an MOS transistor having a gate electrically-connected to the floating diffusion 90. The reset gate electrode 92 contains, e.g., polycrystal silicon or amorphous silicon.

The signal charges are transferred to the floating diffusion 90 via the horizontal transfer channel 66. When the floating diffusion 90 is electrically isolated, the signal charges are subjected to charge/voltage conversion by the transferred charges and capacitance of the floating diffusion 90. The converted voltage signal is amplified by the amplifier 94 and an image signal is output.

Figure 4A:
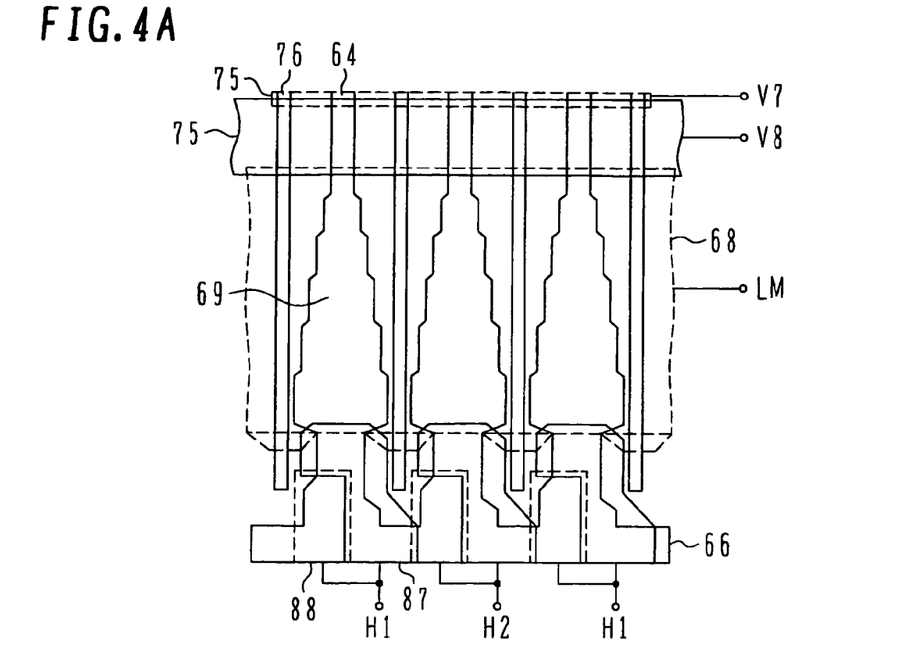
FIGS. 4A and 4B are plan views schematically showing the periphery of a line memory in the solid-state image pickup device.
Figure 4B:
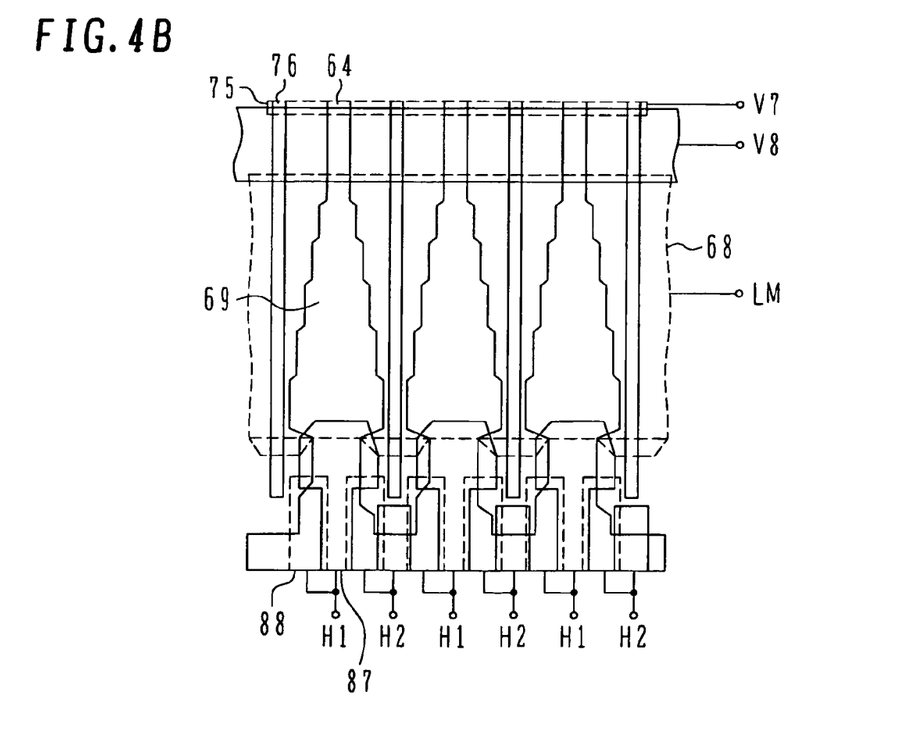

After the charge/voltage conversion of the signal charges transferred to the floating diffusion 90, the signal charges are released via the reset gate 91 to the reset drain 93 before signal charges of a next pixel are sent to the charge detecting unit 67. Upon discharging the charges, a constant voltage ΦRG is applied to the reset gate electrode 92. FIGS. 4A and 4B are plan views schematically showing the periphery of a line memory in the solid-state image pickup device.

Referring to FIG. 4A, the line memory 68 comprises a line-memory transfer path 69 and an electrode formed to the top thereof. The line-memory transfer path 69 is an n-type region formed to the p-type well, continuously to the vertical transfer channel 64. The signal charges generated at the photosensitive region and transferred via the vertical transfer channel are temporarily stored to the line-memory transfer path 69. Thereafter, the signal charges are read to the horizontal transfer channel 66. As shown in the FIG. 4A, a line memory has a long electrode length. In the case of vertical addition in the charge transfer, the charges need to be stored to the line memory, and the length of a line-memory transfer path in the column direction needs to be ensured to some degree. Therefore, a line memory having a long electrode length is necessary.

The line-memory transfer path 69 has a structure that is stepwise wider as the line-memory transfer path 69 shown in FIG. 4A is closer to the down side (on the side of the horizontal transfer channel 66). With the structure having a more increased channel width of the line-memory transfer path 69 as the line-memory transfer path 69 is closer to the down side, a narrow channel advantage is reduced and the charges are transferred by drift electric-field (the charges are transferred within the line-memory transfer path 69). Incidentally, the line-memory transfer path 69 may have a structure that is continuously wider, not stepwise.

The signal charges are transferred in the vertical transfer channel 64 by, e.g., quadri-phase drive. The charges are transferred by applying pulse voltages V1 to V8 whose timings are controlled to eight vertical transfer electrodes 75 continuous in the column direction. Within a range shown in the drawing, the pulse voltage V8 is applied to the vertical transfer electrode 75 (vertical terminal electrode) arranged at the close position of the line memory 68, and the pulse voltage V7 is applied to a vertical transfer electrode arranged to the upstream of one stage.

The charge are moved from the line memory 68 to the horizontal transfer channel 66 by applying a low pulse-voltage LM to the electrode formed above the line-memory transfer path 69 and further applying a high pulse-voltage H1 or H2 to the horizontal transfer electrode.

The signal charges read from the line-memory transfer path 69 to the horizontal transfer channel 66 are transferred in the horizontal transfer channel 66. In FIG. 4A, a solid-state image pickup device is shown with a structure having two electrodes to one line-memory transfer path 69. In the solid-state image pickup device with the structure, the signal charges are read alternately in column from the line memory 68 and are transferred in the left direction of the horizontal one. The charges are transferred to a pair of the adjacent commonly-connected first-and second-layer horizontal transfer electrodes 87 and 88 by applying the pulse voltages H1 and H2 whose timings are controlled.

Referring to FIG. 4B, a solid-state image pickup device has a structure having four electrodes to one line-memory transfer path 69. In the solid-state image pickup device having this structure, the signal charges on all columns can be read from the line memory 68, and the read signal charge are transferred in the left direction of the horizontal one.

Figures 5A, 5B, 5C:
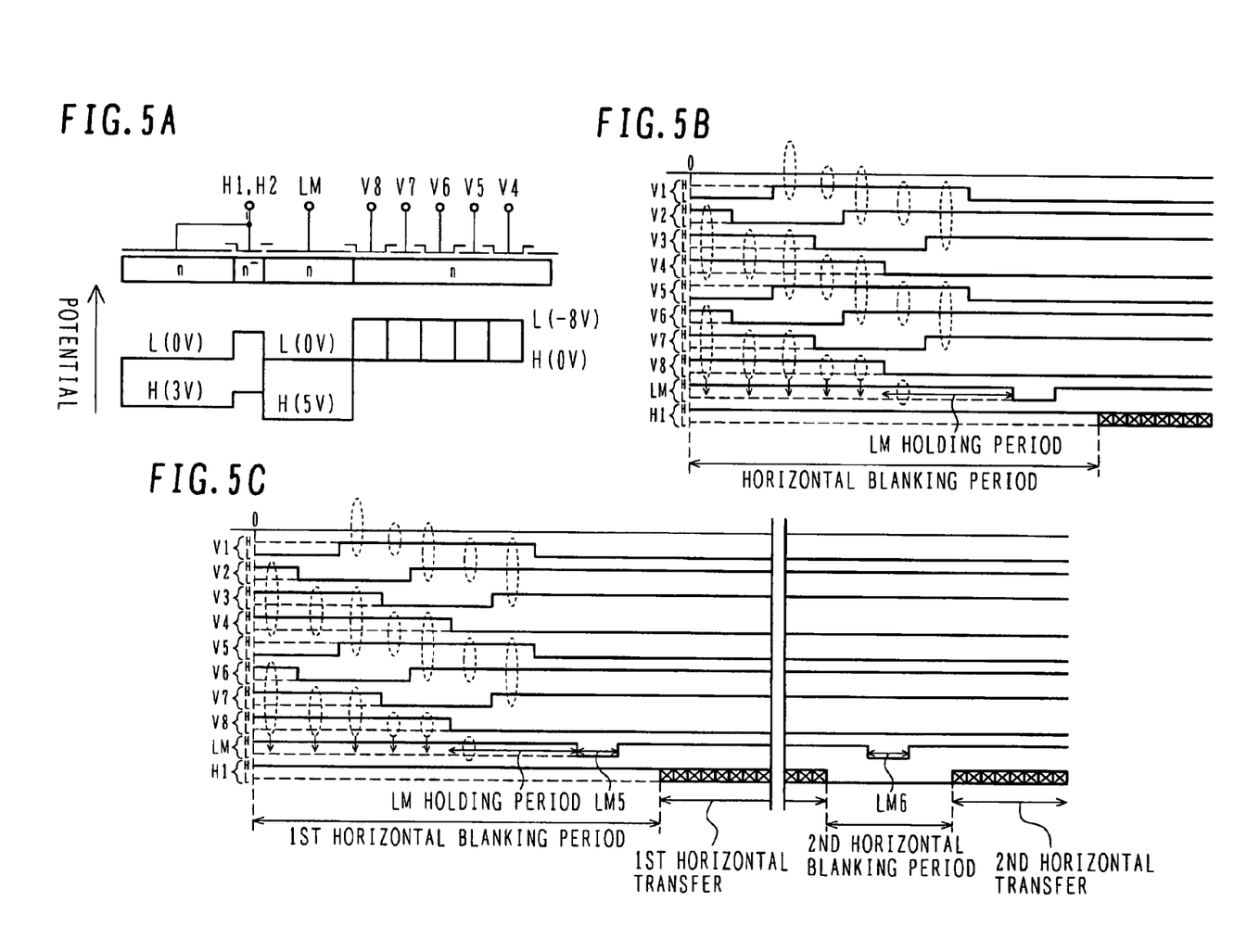
FIG. 5A is a potential diagram for illustrating the charge movement in the channel.
FIG. 5B and 5C are drive timing charts for transferring signal charges as examples.

FIG. 5A is a potential diagram for illustrating the charge movement in the channel. FIGS. 5B and 5C are diagrams showing examples of drive timing charts for transferring the signal charges.

Referring to FIG. 5A, transfer pulse voltages V1 to V8 whose timings are controlled, having two voltages H (0V) and L (−8V), are applied to the vertical transfer electrode, and the charges are transferred in the vertical transfer channel. The signal charges transferred to the end of the vertical transfer channel are stored to the line memory.

A pulse voltage LM whose timing is controlled, comprising two voltages H (5V) and L (0V), can be applied to the electrode above the line-memory transfer path. Further, a pulse voltage H1 or H2 whose timing is controlled, comprising two voltages of H (3V) and L (0V), can be applied to the horizontal transfer electrode. The pulse voltage LM is set as L (0V) and the pulse voltage H1 or H2 is set as H (3V), thereby transferring the charges from the line-memory transfer path to the horizontal transfer channel.

The charges transferred to the horizontal transfer channel are transferred in the horizontal direction by applying transfer pulse voltages H1 and H2 to the horizontal transfer electrode.

FIG. 5B is referred to.

Voltages V1 to V8 denote voltages applied to eight vertical transfer electrodes continuous in the column direction. By applying the voltages V1 to V8, the signal charges are transferred in the vertical transfer channel with quadri-phase drive. A set of the voltages V1 to V4 and a set of the voltages V5 to V8 have the same waveform by the correspondence of the voltages V1 and V5, and entirely form the same drive signal. By applying the voltages V1 to V8, thin-out and reading operation from the photosensitive region can be performed.

An ellipsoid shown by a dotted line in FIG. 5B denotes a region where the charges that are being transferred. The signal charges read from the photosensitive region are transferred in the line memory direction every time when the voltages V1 to V8 applied to the vertical transfer electrode change between the voltages H to L. The signal charges transferred to the end of the vertical transfer channel are moved to the line-memory transfer path. In FIG. 5B, the movement to the line-memory transfer path is shown by an arrow.

The stage of the voltage V8 is referred to. At the changing timing of the voltage V8 from H to L, the charge transfer from the vertical transfer channel to the line-memory transfer path ends.

A stage of the voltage LM is referred to. During a period in which the voltage is set as L (the voltage H1 is H during this period), charges are transferred from the line-memory transfer path to the horizontal transfer channel. Therefore, during a period from a timing at which the voltage V8 is L to a timing at which the voltage LM is L (LM holding period), the signal charges are moved in the line-memory transfer path in the direction of the horizontal transfer channel.

A stage of the voltage H1 is referred to. During a period for applying horizontal transfer voltage alternately-having the voltages H and L to the horizontal transfer electrode, the charges are transferred in the horizontal transfer channel. A period from the end of the previous horizontal transfer to the start of the current horizontal transfer becomes a horizontal blanking period.

FIG. 5C is referred to. FIG. 5C is a diagram showing another example of the drive timing chart.

Unlike the driving method with the timing charge shown in FIG. 5B, a period for transferring the charges from the line-memory transfer path to the horizontal transfer channel includes two periods (LM5 and LM6 shown in FIG. 5C). For example, during the period LM5 for transferring the charges from the line-memory transfer path to the horizontal transfer channel, the charges on the odd column are transferred from the line-memory transfer path to the horizontal transfer channel. During the period LM6 for transferring the charges from the line-memory transfer path to the horizontal transfer channel, the charges on the even column are transferred from the line-memory transfer path to the horizontal transfer channel.

The charges on the odd column transferred during the period LM5 are transferred in the horizontal transfer channel toward the charge detecting unit during a first horizontal transfer period. The charges on the even column transferred during the period LM6 are transferred in the horizontal transfer channel toward the charge detecting unit during a second horizontal transfer period. As shown in FIG. 5C, a second horizontal blanking period is shorter than a first horizontal blanking period and, however, both the periods may be the same (refer to, e.g., Japanese Unexamined Patent Application Publication No. 2002-112122 (Patent Document 1) or Japanese Unexamined Patent Application Publication No. 2002-185870 (Patent Document 2).

SUMMARY OF THE INVENTION

Accordingly, it is an object of the present invention to provide a driving method of a solid-state image pickup device which realizes a preferable display quality.

According to one aspect of the present invention, there is provided a driving method of a solid-state image pickup device comprising: a first-conductive-type semiconductor substrate; a second-conductive-type well that is formed in the semiconductor substrate, corresponding to an inverse-type of the first-conductive-type; a charge storage region that is formed by arranging a plurality of the first-conductive-type charge storage regions formed in the well like a matrix and stores a signal charge generated in accordance with the amount of incident light; a vertical transfer channel of the first-conductive-type that is formed in the well along a column of the charge storage region arranged like the matrix, reads the signal charges stored to the charge storage region, and transfers the signal charges in the column direction; a line-memory transfer path of the first-conductive-type the that is formed in the well, is connected to an end of the vertical transfer channel, and holds the signal charges from the vertical transfer channel; and a horizontal transfer channel of the first-conductive-type that is formed in the well, is connected to an end of the line-memory transfer path, and transfers the signal charges transferred from the line-memory transfer path in the row direction, wherein the signal charges stored to the charge storage region are read to the vertical transfer channel, are transferred to the horizontal transfer channel one row by one row during one horizontal blanking period, and the signal charges are output. The driving method comprises the steps of: transferring the signal charges on a first row from the vertical transfer channel to the line memory during a first horizontal blanking period; transferring the signal charges on the first row from the line memory to the horizontal transfer channel during a next second horizontal blanking period; and thereafter transferring the signal charges on a second row next to the first row from the vertical transfer channel to the line memory that is vacant.

According to another aspect of the present invention, there is provided a driving method of a solid-state image pickup device comprising: a first-conductive-type semiconductor substrate; a second-conductive-type well that is formed in the semiconductor substrate, corresponding to an inverse-type of the first-conductive-type; a charge storage region that is formed by arranging a plurality of the first-conductive-type charge storage regions formed in the well like a matrix and stores a signal charge generated in accordance with the amount of incident light; a vertical transfer channel of the first-conductive-type that is formed in the well along a column of the charge storage region arranged like the matrix, reads the signal charges stored to the charge storage region, and transfers the signal charges in the column direction; a line-memory transfer path of the first-conductive-type the that is formed in the well, is connected to an end of the vertical transfer channel, and holds the signal charges from the vertical transfer channel; and a horizontal transfer channel of the first-conductive-type that is formed in the well, is connected to an end of the line-memory transfer path, and transfers the signal charges transferred from the line-memory transfer path in the row direction, wherein the signal charges stored to the charge storage region are read to the vertical transfer channel, are transferred to the horizontal transfer channel once during one horizontal blanking period, and the signal charge are output. The driving method comprises the steps of: transferring signal charges on a first row from the vertical transfer channel to the line memory during the first horizontal blanking period; partly transferring the signal charges from the line memory to the horizontal transfer channel during a second horizontal blanking period; transferring the remaining signal charges on the first row from the line memory to the horizontal transfer channel during a third horizontal blanking period; and thereafter transferring signal charges on a second row next to the first row from the vertical transfer channel to the line memory that becomes vacant.

Advantageously, a driving method of a solid-state image pickup device can be provided to realize a preferable display quality.

DESCRIPTION OF THE PREFERRED EMBODIMENTS

The present inventor invents that, upon transferring charges in accordance with a drive timing chart shown in FIG. 5B, stripes are generated in an image due to a factor that is considered a transfer defect in the line memory.

With the charge transfer method shown the drive timing chart in FIG. 5B, with respect to the charge transfer in a line memory having a long electrode length, after transferring signal charges from the vertical transfer channel to the line-memory transfer path, the signal charges are moved in the line-memory transfer path and the signal charges are transferred from the line-memory transfer path to the horizontal transfer channel during the same horizontal blanking period.

In this case, a period (line memory holding period) for moving the charges in the line-memory transfer path includes a transfer period from the vertical transfer channel to the line-memory transfer path and a short period excluding a transfer period from the line-memory transfer path to the horizontal transfer channel.

The transfers from the vertical transfer channel to the line-memory transfer path and from the line-memory transfer path to the horizontal transfer channel are smooth because the potential differential caused by the voltage applied to the transfer electrode is large. However, the charges in the line-memory transfer path are not smoothly moved. Because the electrode length of the line memory is long and the potential difference in the line-memory transfer path is not large.

Therefore, when a charge moving velocity can be slow in the line-memory transfer path, the charge transfer in the horizontal transfer channel starts during completely transferring the charges from the line-memory transfer path to the horizontal transfer channel and the charges partly remain in the line-memory transfer path and stripes are generated in the image.

First, the present inventors consider that it is advantageous that the charges are sufficiently moved in the line-memory transfer path so as to suppress the generation of strips in the image due to a transfer defect in the line-memory transfer path and the charges are transferred to the horizontal transfer channel.

Figure 1:
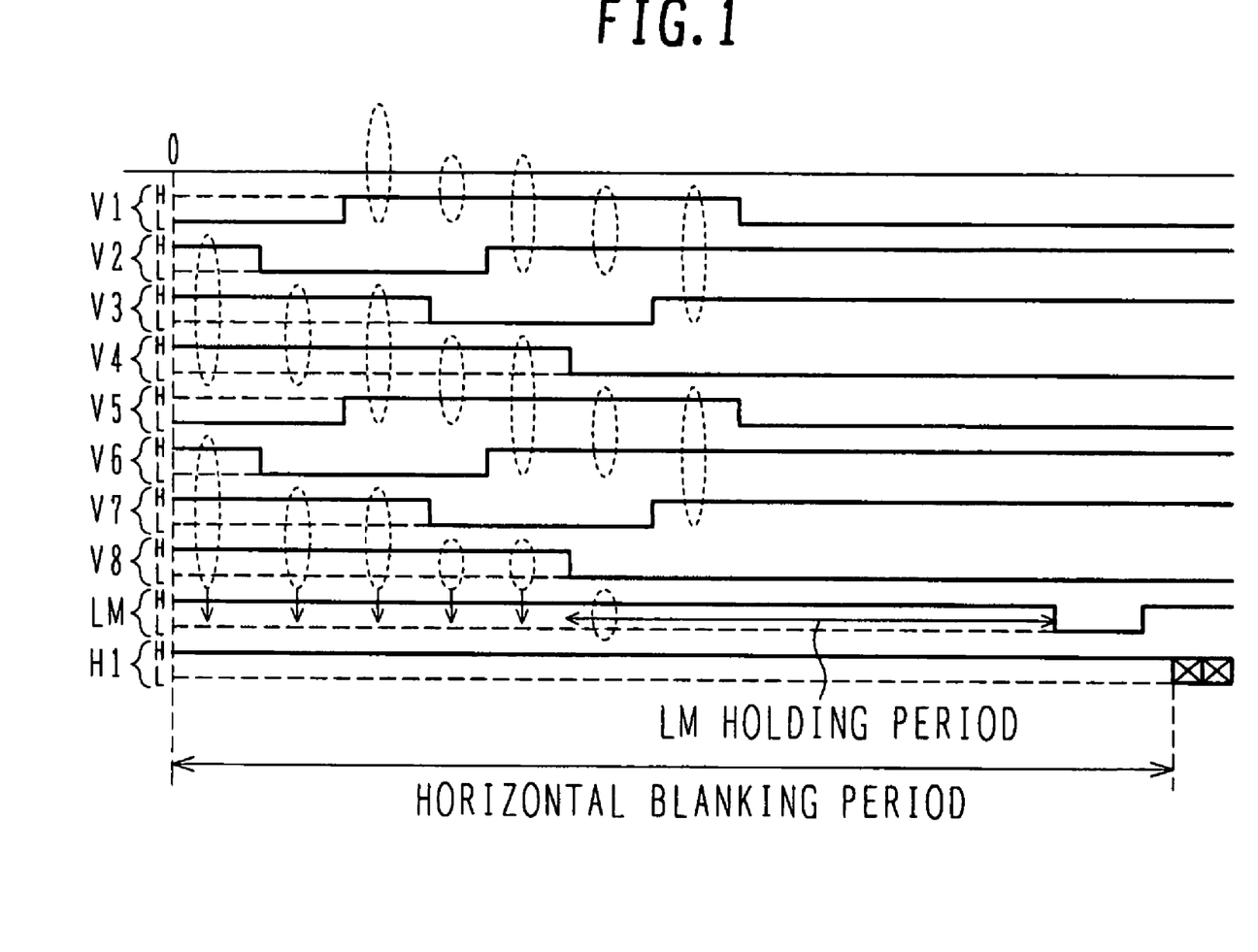
FIG. 1 is a drive timing chart showing an example for suppressing a charge transfer default in a line-memory transfer path by ensuring a long LM holding period.

FIG. 1 shows an example of a drive timing chart for suppressing a charge transfer default in the line-memory transfer path by ensuring a long-time LM holding period.

In the drive timing chart shown in FIG. 1, a stage of the voltage LM and a stage of the voltage H1 are different from those shown in FIG. 5B.

The stage of the voltage LM is referred to. A time for setting the voltage applied to the electrode of the line memory from H to L is delayed, thereby ensuring a long LM holding period.

The stage of the voltage H1 is referred to. In accordance with the change in timing of voltage applied to electrode of the line memory, the time for starting to apply a horizontal transfer voltage alternately-having the voltages H and L to the horizontal transfer electrode is delayed.

As mentioned above, the time for setting the voltage applied to the electrode of the line memory from H to L is delayed, even if the LM holding period is simply ensured for a longer time in accordance therewith, a transfer defect is thus improved in the line-memory transfer path. However, the time for starting to apply the horizontal transfer voltage alternately-having the voltages H and L to the horizontal transfer electrode is delayed, and the horizontal blanking period is longer in accordance therewith and a frame rate is thus reduced.

Then, the present inventors devise a driving method shown in the following drawings.

Figure 2A:
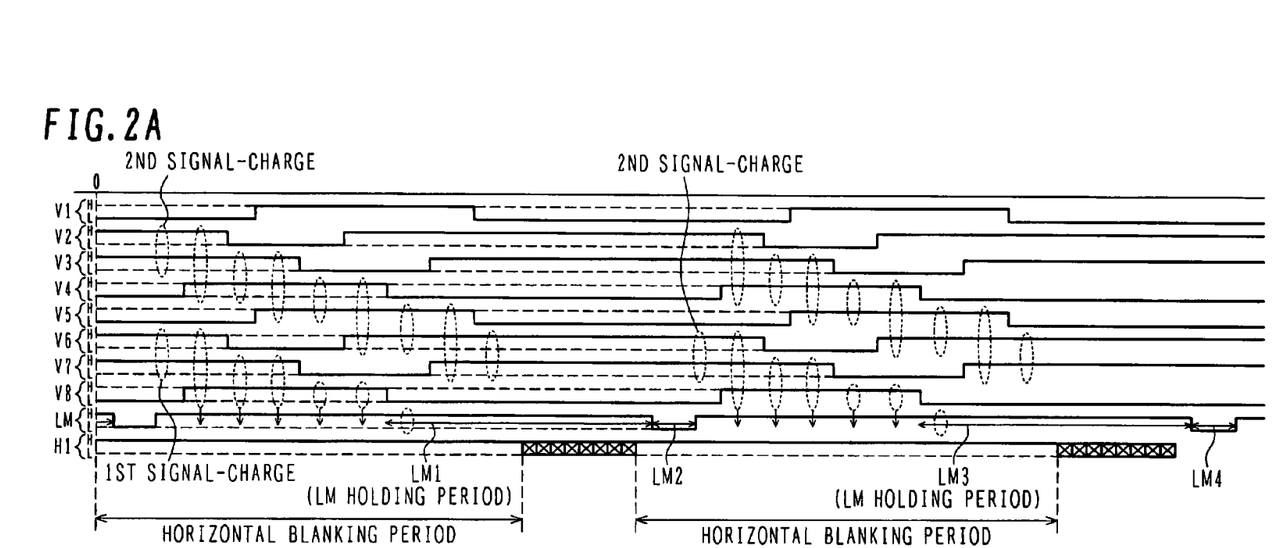
FIGS. 2A and 2B are drive timing charts showing a driving method of a solid-state image pickup device according to first and second embodiments of the present invention.
Figure 2B:
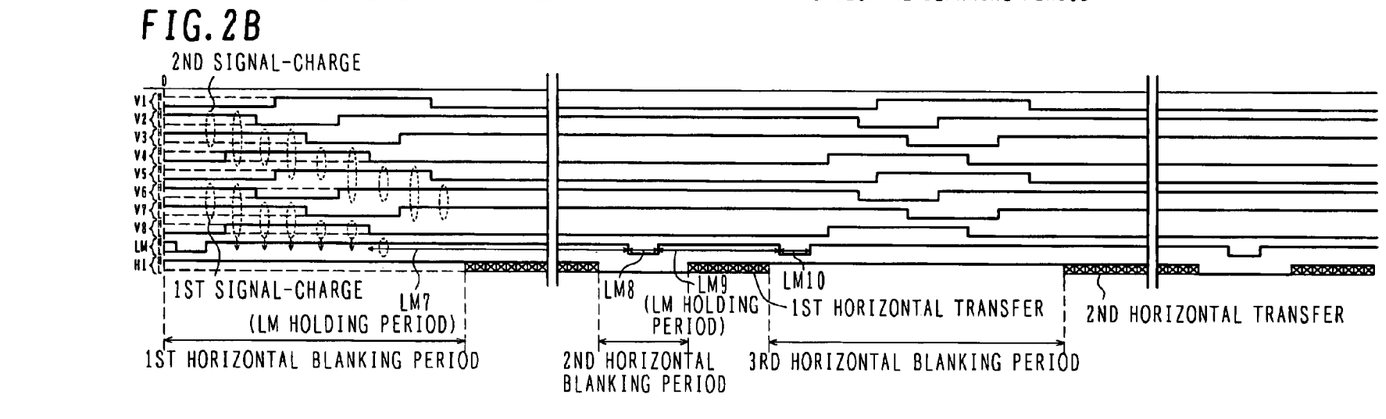

FIGS. 2A and 2B are drive timing charts showing a driving method of a solid-state image pickup device according to first and second embodiments. The solid-state image pickup device is identical to conventional ones shown in FIGS. 3A to 3D and 4A to 4B.

For the purpose of convenience of forming the drawing, start points (0 points) shown in FIGS. 2A and 2B are different from those shown in FIGS. 1, 5A, and 5B. However, waveforms V1 to V8 are the same as those shown in FIGS. 1, 5A, and 5B.

Similarly to the FIGS. 1, 5A, and 5B, a region where the charges in progress of transfer exist is shown by a dotted elliptic. Signal charges read from the photosensitive region are transferred in the direction of the line memory every change in voltages V1 to V8 applied to the vertical transfer electrode between the voltages H and L. The signal charges transferred to the end of the vertical transfer channel are moved to the line-memory transfer path. The movement to the line-memory transfer path is shown by an arrow in FIGS. 2A and 2B.

FIG. 2A is a drive timing chart showing a driving method of a solid-state image pickup device according to the first embodiment of the present invention.

A dotted elliptical region shown as "a first signal charge" is referred to. The first signal charges form a row in an image. Light is incident on the photosensitive region, and the first signal charges stored to the charge storage region by photoelectric conversion are transferred to the vertical transfer channel and are transferred to the downstream (on the side of the line memory) by driving with drive voltages V1 to V8. The first signal charges transferred to the terminal transfer stage of the vertical transfer channel are transferred to the line-memory transfer path, as shown by an arrow.

The first signal charges are held to the line-memory transfer path during an LM-holding period LM1. During the LM-holding period LM1, a horizontal transfer voltage H1 alternately-having voltages H and L is applied to the horizontal transfer electrode, and signal charges just-before the first signal charge are transferred to the charge detecting unit in the horizontal transfer channel.

During an LM-holding period LM2 (period in which the voltage LM is L and the voltage H1 is H) in the drawings, the first signal charges are transferred to the horizontal transfer channel from the line-memory transfer path.

A dotted elliptical region shown as "a second signal charge" is referred to. The second signal charges form the remaining signals on the next row (upstream row) formed by the first signal charges or on the same row in the image comprising the first signal charge. Light is incident on the photosensitive region, and the second signal charges stored to the charge storage region by photoelectrical conversion are transferred to the vertical transfer channel and are transferred to the downstream (on the side of the line memory) by driving with drive voltages V1 to V8. The second signal charges are transferred in the vertical transfer channel just after the first signal charges. The second signal charges transferred to the final transfer stage of the vertical transfer channel are transferred to the line-memory transfer path, as shown by an arrow. The second signal charges are transferred to the line-memory transfer path after an LM-holding period LM2 (after the first signal charges are transferred from the line-memory transfer path to the horizontal transfer channel).

The second signal charges are held to the line-memory transfer path during an LM-holding period LM3. During the LM-holding period LM3, a horizontal transfer voltage H1 alternately-having voltages H and L is applied to the horizontal transfer electrode, and the first signal charges are transferred to the charge detecting unit in the horizontal transfer channel.

During an LM-holding period LM4 (period in which the voltage LM is L and the voltage H1 is H) in FIG. 2A, the second signal charges are transferred to the horizontal transfer channel from the line-memory transfer path.

The second signal charges are transferred to the charge detecting unit in the horizontal transfer channel during a period in which the third signal charges are held to the line memory.

According to the first embodiment, the horizontal blanking period is the same as that in the drive timing chart shown in FIG. 5B.

FIG. 2B is a drive timing chart showing a driving method of a solid-state image pickup device according to the second embodiment of the present invention.

Unlike the driving method with the timing chart shown in FIG. 2A, FIG. 2B shows a period for transferring charges from the line-memory transfer path to the horizontal transfer channel includes two periods (LM8 and LM10 in FIG. 2B). Reference numeral LM8 denotes a period for transferring the charges on the odd column of the first signal charges from the line-memory transfer path to the horizontal transfer channel.

Reference numeral LM10 denotes a period for transferring the charges on the even column from the line-memory transfer path to the horizontal transfer channel.

During the first horizontal blanking period, first signal charges are transferred from the vertical transfer channel to the line-memory transfer path. The first signal charges are held in the line-memory transfer path without change. During the second horizontal blanking period LM8, the charges on an odd column are transferred from the line-memory transfer path to the horizontal transfer channel.

The charges on the odd column transferred to the horizontal transfer channel during the second horizontal blanking period LM8 are transferred toward the charge detecting unit in the horizontal transfer channel during the first horizontal-transfer period. In this case (during the period LM9), the charges on the even column are held in the line-memory transfer path.

The first horizontal-transfer ends and the horizontal transfer channel becomes vacant. Thereafter, during the third horizontal blanking period LM10, the charges on the even column are transferred from the line-memory transfer path to the horizontal transfer channel. The second signal charge is transferred from the vertical transfer channel to the line-memory transfer path that becomes vacant. During the transfer time, among the first signal charge, the charges on the even column are held in the horizontal transfer channel. The second signal charges are transferred from the vertical transfer channel to the line-memory transfer path. Thereafter, among the first signal charge, the charges on the even column are transferred in the horizontal transfer channel toward charge detecting unit.

Conceptually, the first to third horizontal blanking periods shown in FIG. 2B do not match the horizontal blanking period shown in FIG. 2A. Referring back to FIG. 2A, during one horizontal blanking period, the signal charges on one row are transferred from the vertical transfer channel to the line-memory transfer path. During the next horizontal blanking period, the signal charges on the next row are transferred from the vertical transfer channel to the line-memory transfer path. Referring to FIG. 2B, during the first horizontal blanking period, the signal charges on one row are transferred from the vertical transfer channel to the line-memory transfer path. During the second horizontal blanking period, the signal charges transferred to the line-memory transfer path are partly transferred from the line-memory transfer path to the horizontal transfer channel. Further, during the third horizontal blanking period, among the signal charge on one row transferred to the line-memory transfer path during the first horizontal blanking period, the remaining signal charges that are not transferred to the horizontal transfer channel during the second horizontal blanking period are transferred from the line-memory transfer path to the horizontal transfer channel. Thereafter, the signal charges on the next row are transferred from the vertical transfer channel to the line-memory transfer path.

According to the driving methods with the drive timing charts shown in FIGS. 1, 5B, and 5C, the charges are transferred to the line memory before the horizontal transfer. Therefore, there is problem that a long LM-holding period cannot be ensured. Alternatively, the horizontal blanking period becomes long because the long LM-holding period is ensured.

According to the driving methods with the drive timing charts shown in FIGS. 2A and 2B, after the horizontal transfer and before the vertical transfer, the charges are transferred to the line memory. Therefore, the LM-holding period can be long (corresponding to the horizontal transfer period) without extending the horizontal blanking period. Thus, according to this driving method, even if a portion having a slow charge moving velocity exists in the line-memory transfer path, a charge transfer rate in the line-memory transfer path can be increased. Accordingly, the generation of stripes in the image can be suppressed and a high image quality can be provided. Incidentally, a frame rate is not reduced.

Further, according to the driving method of the solid-state image pickup device, as compared with the case with the driving method having the drive timing charts shown in FIGS. 1, 5B, and 5C, signals corresponding to the number of vertical transfer stages are output. However, any problems do not occur in the image under the control on the signal processing.

The present invention can be applied to both the interline-type (including a frame-interline-transfer (FIT) type) solid-state image pickup device shown in FIG. 3A and the solid-state image pickup device having a pixel interleaved array shown in FIG. 3B.

As mentioned above, the embodiments of the present invention have been described. However, the present invention is not limited to those. For example, the LM-holding period in the horizontal blanking period can be reduced. Therefore, the transfer period LM2 from the line memory to the horizontal transfer channel can be increased. Thus, the charge transfer can be performed without fail. IN addition, it is obvious for those in the art other changes, improvement, and combinations can be variously performed.

What is claimed are:

1. A driving method of a solid-state image pickup device, the solid-state image pickup device comprising:
   a first-conductive-type semiconductor substrate;
   a second-conductive-type well that is formed in the semiconductor substrate, corresponding to an inverse-type of the first-conductive-type;
   a charge storage region that is formed by arranging a plurality of the first-conductive-type charge storage regions formed in the well like a matrix and stores a signal charge generated in accordance with the amount of incident light;
   a vertical transfer channel of the first-conductive-type that is formed in the well along a column of the charge storage region arranged like the matrix, reads the signal charges stored to the charge storage region, and transfers the signal charges in the column direction;
   a line-memory transfer path of the first-conductive-type the that is formed in the well, is connected to an end of the vertical transfer channel, and holds the signal charges from the vertical transfer channel; and
   a horizontal transfer channel of the first-conductive-type that is formed in the well, is connected to an end of the line-memory transfer path, and transfers the signal charges transferred from the line-memory transfer path in the row direction,
   wherein the signal charges stored to the charge storage region are read to the vertical transfer channel, are transferred to the horizontal transfer channel one row by one row during one horizontal blanking period, and the signal charges are output,
   the driving method comprising the steps of:
   transferring the signal charges on a first row from the vertical transfer channel to the line memory during a first horizontal blanking period;
   transferring the signal charges on the first row from the line memory to the horizontal transfer channel during a next second horizontal blanking period with the first horizontal blanking period and the second horizontal blanking period being separate and distinct, and during the second horizontal blanking period a transfer of any remaining signal charges on the first or a previous row takes place; and
   thereafter transferring the signal charges on a second row next to the first row from the vertical transfer channel to the line memory that is vacant.

2. A driving method of a solid-state image pickup device according to claim 1, wherein the solid-state image pickup device is a solid-state image pickup device having a pixel interleaved array.

3. A driving method of a solid-state image pickup device according to claim 1, wherein the first-conductive-type is an n-type.

4. A driving method of a solid-state image pickup device, the solid-state image pickup device comprising:
   a first-conductive-type semiconductor substrate;
   a second-conductive-type well that is formed in the semiconductor substrate, corresponding to an inverse-type of the first-conductive-type;
   a charge storage region that is formed by arranging a plurality of the first-conductive-type charge storage regions formed in the well like a matrix and stores a signal charge generated in accordance with the amount of incident light;
   a vertical transfer channel of the first-conductive-type that is formed in the well along a column of the charge storage region arranged like the matrix, reads the signal charges stored to the charge storage region, and transfers the signal charges in the column direction;
   a line-memory transfer path of the first-conductive-type the that is formed in the well, is connected to an end of the vertical transfer channel, and holds the signal charges from the vertical transfer channel; and
   a horizontal transfer channel of the first-conductive-type that is formed in the well, is connected to an end of the line-memory transfer path, and transfers the signal charges transferred from the line-memory transfer path in the row direction,
   wherein the signal charges stored to the charge storage region are read to the vertical transfer channel, are transferred to the horizontal transfer channel once during one horizontal blanking period, and the signal charge are output,
   the driving method comprising the steps of:
   transferring signal charges on a first row from the vertical transfer channel to the line memory during the first horizontal blanking period;
   partly transferring the signal charges from the line memory to the horizontal transfer channel during a second horizontal blanking period;
   transferring the remaining signal charges on the first row from the line memory to the horizontal transfer channel during a third horizontal blanking period; and
   thereafter transferring signal charges on a second row next to the first row from the vertical transfer channel to the line memory that becomes vacant.

5. A driving method of a solid-state image pickup device according to claim 4, wherein the solid-state image pickup device is a solid-state image pickup device having a pixel interleaved array.

6. A driving method of a solid-state image pickup device according to claim 4, wherein the first-conductive-type is an n-type.

* * * * *